(12) United States Patent
Noe (10) Patent No.: US 7,132,817 B2
(45) Date of Patent: Nov. 7, 2006

(54) UNBALANCE DYNAMIC LOAD GENERATOR

(75) Inventor: Mathieu Noe, Barbizon (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 10/369,439

(22) Filed: Feb. 19, 2003

(65) Prior Publication Data

US 2004/0140789 A1   Jul. 22, 2004

(30) Foreign Application Priority Data

Jan. 17, 2003   (FR) .................... 03 00512

(51) Int. Cl.
*H02H 7/06* (2006.01)
*H02P 11/00* (2006.01)
*H02P 9/00* (2006.01)

(52) U.S. Cl. ........................................ 322/29

(58) Field of Classification Search ............... 366/128, 366/528.16; 700/280; 74/69, 87; 322/29
See application file for complete search history.

(56) References Cited

U.S. PATENT DOCUMENTS

| | | | | |
|---|---|---|---|---|
| 3,640,508 A | * | 2/1972 | Reibig | 366/116 |
| 5,099,430 A | * | 3/1992 | Hirsch | 73/462 |
| 5,172,599 A | * | 12/1992 | Woltering | 74/61 |
| 5,323,078 A | * | 6/1994 | Garcia | 310/156.22 |
| 5,400,256 A | * | 3/1995 | Beale et al. | 701/124 |
| 5,825,663 A | * | 10/1998 | Barba et al. | 702/41 |
| 5,850,110 A | * | 12/1998 | Kroger | 310/81 |
| 5,903,077 A | * | 5/1999 | Garnjost et al. | 310/81 |
| 6,212,445 B1 | * | 4/2001 | Barba et al. | 700/280 |
| 6,236,934 B1 | * | 5/2001 | Dyer et al. | 701/124 |
| 6,345,546 B1 | * | 2/2002 | Houze | 74/61 |
| 6,445,149 B1 | * | 9/2002 | Muramatsu et al. | 318/114 |
| 6,504,278 B1 | * | 1/2003 | Bald et al. | 310/81 |

FOREIGN PATENT DOCUMENTS

| | | | |
|---|---|---|---|
| DE | 44 07 013 A | | 9/1995 |
| EP | 0 092 014 A | | 10/1983 |
| EP | 0 337 040 A | | 10/1989 |
| EP | 0 840 191 A | | 5/1998 |

* cited by examiner

*Primary Examiner*—Julio Gonzalez
(74) *Attorney, Agent, or Firm*—Alston & Bird LLP (57) ABSTRACT

The invention relates to an unbalance dynamic load generator comprising at least one pair of eccentric rotating masses (M) which are symmetric with respect to a plane and whose motion is controlled by at least one control signal generated by a control module as a function of a preset signal (Fd(t)) having a given frequency. It is characterized in that, for at least one of the masses, it comprises a reference angular position sensor (C) delivering a position signal (SP) representing the passing of the said rotating mass (M) through a reference angular position and a control circuit comprising a calculation circuit (DSP) for calculating the periodicity of the rotation of the said mass from the successive position signals delivered by the position sensor (C) and for generating the said control signal (CS) as a function of the difference between the measured periodicity and the periodicity of the preset signal.

17 Claims, 4 Drawing Sheets

UNBALANCE DYNAMIC LOAD GENERATOR

The present invention relates to an unbalance dynamic load generator comprising at least one pair of eccentric rotating masses arranged symmetrically with respect to a plane.

Such a device comprising a pair of eccentric masses is known from French patent FR 2 169 672 (VIBROVERKEN) filed on 25 Jan. 1973.

Devices are also known which use two pairs of rotating masses which make it possible to compensate a vibratory force created in a body. Such devices are described in particular in European patent application EP 337 040 (ALSTHOM) in which the four masses are independent, and in the patent U.S. Pat. No. 5,903,077 (MOOG Inc.) in which the masses are mechanically coupled in pairs. Continuous sensors (angular coder or synchro-resolver) which are expensive to implement are used to achieve the servocontrol of frequency and of phase of the rotating masses.

The subject of the present invention is an unbalance dynamic load generator of the aforesaid type which has a reduced cost relative to the known solutions.

The basic idea of the invention is that, surprisingly, efficient control can be achieved by sensing the angular position of the eccentric rotating masses at just one point (or at a few points) for each revolution.

Hence, it is possible to use point sensors (Hall-effect sensor, optical sensor, etc.) whose cost is much lower than that of the sensors used hitherto to obtain a continuous measurement of the angular position of the eccentric rotating masses, this measurement being regarded as necessary for the envisaged application because of the irregularities caused by the eccentricity of the masses.

The invention thus relates to an unbalance dynamic load generator comprising at least one pair of eccentric rotating masses which are symmetric with respect to a plane and whose motion is controlled by at least one control signal generated by a control module as a function of a preset signal having a given frequency, characterized in that, for at least one of the masses, it comprises a reference angular position sensor delivering a position signal representing the passing of the said rotating mass through a reference angular position and a control circuit comprising:

- a calculation circuit for calculating the periodicity of the rotation of the said mass from the successive position signals delivered by the position sensor and for generating the said control signal as a function of the difference between the measured periodicity and the periodicity of the preset signal.

The generator can be characterized in that it comprises a phase measurement circuit for measuring a time gap (or phase error) between the signal delivered by the position sensor and a reference point of the preset signal and in that the calculation circuit comprises a corrector module for generating the said control signal also as a function of the difference between the said measured time gap and a preset time gap.

According to a first variant, the masses of at least one pair are mechanically coupled together and there is only a single reference angular position sensor which is associated with one of the two masses of the pair.

According to a second variant, the masses of at least one pair are mechanically independent and the generator exhibits a reference angular position sensor for each of the two masses of the said pair.

According to an advantageous embodiment, the generator is characterized in that it exhibits a time indicator whose value is incremented by a clock and a memory for storing the value of the time indicator when the reference angular position sensor delivers the said position signal and when the preset signal passes through a characteristic point. The calculation circuit can then comprise an element for calculating from the stored values of the time indicator the first time period which separates two successive position signals and the second time period which separates the passing of the preset signal through two successive characteristic points and, to generate the control signal, it comprises an element for calculating the difference between the said first and second time periods.

It is advantageous for the said difference between the first and second periods to be formed with respect to the second period which corresponds to the preset signal. In this way the formed difference corresponds to a relative variation in frequency, thereby facilitating regulation.

The calculation circuit can also comprise a calculation element which receives the stored values of the time indicator and which generates the measured time gap which is determined by differencing between the instant at which the position sensor delivers the position signal and the instant at which the preset signal passes through the said characteristic point.

It is also advantageous to norm the measured time gap with respect to the second time period.

The time indicator can be a counter which is reinitialized periodically, for example by resetting to zero each time it reaches its maximum count.

The generator can also be characterized in that it comprises a logic element for adding to the stored value of the time indicator a value equal to the reinitialization of the count of the counter in respect of the first position signal after each so-called reinitialization of the counter and in respect of the first passing through the said characteristic point of the preset signal after each so-called reinitialization.

According to a particularly advantageous embodiment, the generator is characterized in that it exhibits two pairs of rotating masses, and in that the preset signal exhibits an amplitude representing the modulus of a sinusoidal force to be produced by the conjugate action of two pairs of rotating masses by adjusting a phase φ, one of the pairs of rotating masses exhibiting a lead in phase φ and the other pair of rotating masses a lag in phase φ, with respect to the preset signal, the calculation circuit generating on the one hand a first control signal for adjusting the frequency of rotation of the rotating masses and on the other hand a second control signal for adjusting the said phase φ.

Other characteristics and advantages of the invention will become apparent on reading the following description, in conjunction with the drawings in which.

When one seeks to generate a load on any structure S without relying on another structure, the basic principle consists in relying on a reaction mass m2.

The magnetic load U created between the structure and the mass m2 gives rise to a load Ft in the structure related to U by the relation Ft=H.U where H is a transfer function given by the characteristics of the mounting of the generator:

$$H(p)=m2p^2/(m2p^2+K2),$$

K2 designating the linkage stiffness between the mass m2 and the structure S, and p=jω.

In general the mass m2 consists of the moving mass of an electromagnetic generator (with variable reluctance) or of an electrodynamic generator.

The mass m2 and the stiffness K2 define an oscillating mechanical system whose amplification at resonance can be exploited within the limits of allowable joggle.

This technique is commonly used with electrodynamic generators (plunger coils immersed in a constant field).

Nevertheless, this technique is hardly applicable with electrodynamic generators when one seeks high levels of transmitted load Ft (typically greater than 1 kN) since it would lead to a prohibitive mass and a prohibitive bulk of the permanent magnets which create the magnetic field.

A known solution is that of an unbalance generator such as described for example in the aforesaid documents FR 2 169 672, EP 337 040 and U.S. Pat. No. 5,903,077.

Figure 1:
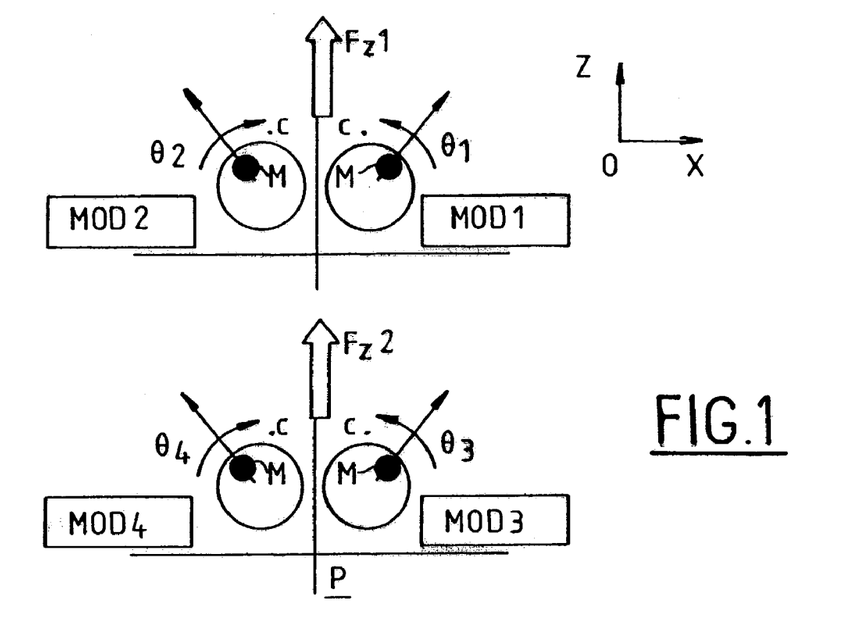
FIG. 1 is a diagrammatic representation of a system with four identical modules, each of which comprises an eccentric mass.

FIG. 1 illustrates a system with four identical modules MOD1, MOD2, MOD3 and MOD4. Each of the modules comprises an eccentric rotary mass M off-centered by a radius of eccentricity R, the masses of the modules of one and the same pair MOD1 and MOD2 on the one hand and MOD3 and MOD4 on the other hand being counter-rotating. The angle made by the straight line which passes through the axis of each of the modules MOD1, MOD2, MOD3 and MOD4 and the center of gravity of each of the masses M with the vertical axis Oz is denoted θ1, θ2, θ3 and θ4 respectively.

We put:
θ1=θ+φ
θ2=π−θ1
θ3=θ−φ
θ4=π−θ3.

The modules MOD1 and MOD2 generate a sinusoidal force $F_{z1}$ of constant amplitude along the axis Oz.

The modules MOD3 and MOD4 generate a sinusoidal force $F_{z2}$ of constant amplitude along the axis Oz.

The resultant of these two forces is a sinusoidal force Fz of amplitude A which can be altered via the angle φ with:

$$Fz(t)=4mR\omega^2 \cos[\theta(t)] \cos\phi \text{ with } \omega=2\pi f$$

f=frequency of rotation of the masses
A=4mRω² cosφ
Hence:
cosφ, hence φ controls the amplitude A (of the force Fz);
φ(t) controls the frequency and the phase of the force Fz.

The system is in general controlled by a sinusoidal signal Fc(t) which is proportional to A cos[φ(t)], and the force Fz is in phase with this preset signal.

When the preset signal reaches 100% of its full scale (for example the full scale of an analog/digital converter), the output force Fz is equal to the maximum force Fmax attainable at the frequency f, i.e.:
Fmax=4mRω² with ω=2πf.

We then have cos φ=1, i.e. φ=0.

For φ=π/2, the force Fz is zero.

For φ lying between 0 and π/2, the force Fz can be altered between 0 and Fmax.

Figure 2:
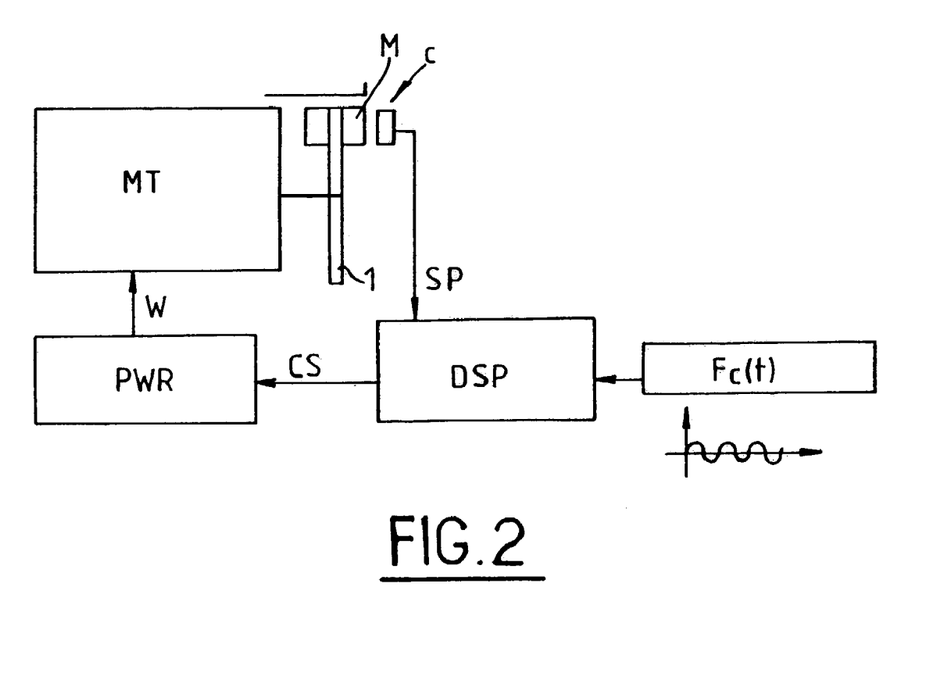
FIG. 2 illustrates the servocontrol loop for a module.

In accordance with FIG. 2, each module (whether there be two or four) comprises a drive motor MT a wheel 1, an eccentric mass 2, and a sensor C which delivers a signal at each revolution for a characteristic position of the mass M for example vertical (φ=0).

The signal from the sensor C is delivered to an input of a signal processor DSP, another input of which receives the preset signal Fc(t). The processor DSP is advantageously common to all the modules. Alternatively, a different processor DSP is assigned to each module or pair of modules.

The processor DSP outputs a control signal CS for example by pulse width modulation which controls a power stage PWR which operates the electric motor MT.

With respect to the solutions described in the documents of patents FR 2 169 672, EP 377 040 and U.S. Pat. No. 5,903,077, the cost generated by a position servocontrol using a synchro-resolver (U.S. Pat. No. 5,903,077) or using an angular coder (EP 377 040) is avoided. Since the control makes it possible to achieve independent servocontrol of each module at competitive cost, it is possible if so desired to also eliminate the drawback of a mechanical drive between the modules, for example a gear drive as in patent U.S. Pat. No. 5,903,077 which generates noise and which has a higher manufacturing and maintenance cost.

In this case the actuator consists of two or four modules which are identical and independent from the mechanical standpoint.

In the case of one or more pairs of modules mechanically coupled together as far as their rotation is concerned, it is sufficient to provide a single sensor for one of the eccentric masses of the pair and a single servocontrol loop per pair of modules.

Moreover, a module can comprise just one wheel 1, one mass M, one sensor C, one power stage PWR and one motor MT, the processor DSP being common to the various modules of the actuator.

Figure 3:
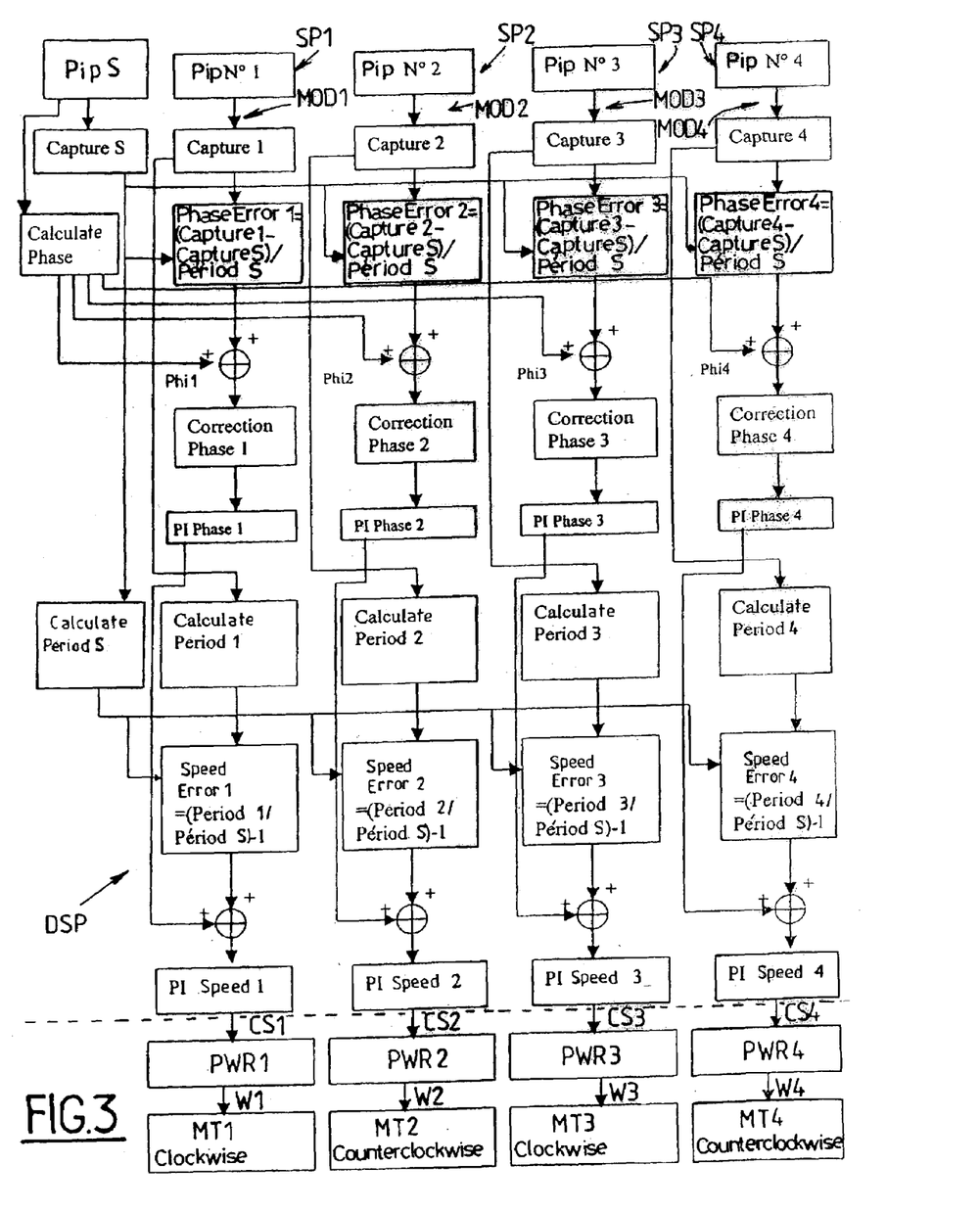
FIG. 3 is a schematic of the operation of a system according to FIG. 1.

FIG. 3 represents a schematic of the operation of the processor DSP.

The passing of the preset signal Fc(t) through a characteristic instant, for example the passing of the rising signal through zero, is detected every period ω with the aid of a Schmitt trigger. One thus obtains a pulse which corresponds to an event Pip S for the preset signal and a command at θ=0 for the modules. With each passing of a mass M in front of a sensor C, the latter delivers a pulse which corresponds to an event Pip 1 to Pip 4 for the modules MOD1 to MOD4. The passing of the mass M by the vertical position (θ=0) is preferably chosen, i.e. the same position as for the characteristic position of the preset signal Fc(t).

The servocontrol system uses one (or more) counter(s) which can be read by interruption of the processor DSP by the events Pip S, Pip 1, Pip 2, Pip 3, Pip 4 which serve to capture the value of the counter. The counter scans the integer values from 0 to 65535 at the frequency Fs1. When it reaches its maximum value Lcounter (for example 65536), its content is reset to 0.

The counter is incremented at a frequency Fs1 which is a submultiple of the frequency of the quartz crystal of the processor: i.e. for example:
Fs1=30 MHz/128=234.4 kHz.

Pip S is dedicated to the preset signal. When the input signal passes through 0 with a positive slope, a capture (reading) of the counter is triggered (for example with the aid of a Schmitt trigger). This value is stored as variable CaptureS. At the next capture, the value of CaptureS is stored in CaptureSp (shift of index), the value of the counter can then be stored in the variable CaptureS.

Pip 1 is dedicated to the motor 1 and to its sensor C. When the signal delivered by the sensor C switches from 0 to 1, a capture (reading) of the counter is triggered. This value is stored as variable Capture1. At the next capture, the value of Capture1 is stored in Capture1$p$ (shift of index), the value of the counter can then be stored in the variable Capture1 (and so on and so forth).

Pip 2 is dedicated to the motor 2 and to its sensor C. When the signal of the sensor C switches from 0 to 1, a capture (reading) of the counter is triggered. This value is stored as variable Capture2. At the next capture, the value of Capture2 is stored in Capture2$p$ (shift of index), the value of the counter can then be stored in the variable Capture2 (and so on and so forth).

Pip 3 is dedicated to the motor 3 and to its sensor C. When the signal of the sensor C switches from 0 to 1, a capture (reading) of the counter is triggered. This value is stored as variable Capture3. At the next capture, the value of Capture3 is stored in Capture3$p$ (shift of index), the value of the counter can then be stored in the variable Capture3 (and so on and so forth).

Pip 4 is dedicated to the motor 4 and to its sensor C. When the signal of the sensor C switches from 0 to 1, a capture of the counter is triggered. This value is stored as variable Capture4. At the next capture, the value of Capture4 is stored in Capture4$p$ (shift of index), the value of the counter can then be stored in the variable Capture4 (and so on and so forth).

From these variables updated at each revolution, a speed error and a phase error are calculated at each revolution. The various periods are calculated first.

Period S=Capture S−Capture Sp
Period 1=Capture 1−Capture 1$p$
Period 2=Capture 2−Capture 2$p$
Period 3=Capture 3−Capture 3$p$
Period 4=Capture 4−Capture 4$p$
Speed error 1=(Period 1 /Period S)−1
Speed error 2=(Period 2 /Period S)−1
Speed error 3=(Period 3 /Period S)−1
Speed error 4=(Period 4 /Period S)−1

This is the speed error normalized with respect to the period Period S of the control signal.

The unnormalized error would be written (Period 1−Period S) for module 1 and so on and so forth.

The various phase errors are also calculated.
Phase error 1=(Capture 1−Capture S)/Period S
Phase error 2=(Capture 2−Capture S)/Period S
Phase error 3=(Capture 3−Capture S)/Period S
Phase error 4=(Capture 4−Capture S)/Period S.

The Speed error signals 1 to 4 make it possible to control the motor MT of each of the modules (or of pairs of modules) directly so as to adjust the frequency of rotation of the masses to the preset value.

For each of the modules, the value of the Phase Error signal referenced from 1 to 4 is compared with a phase preset value computed from the preset signal amplitude Fc(t).

Specifically, as was seen hereinabove, the amplitude of the preset signal is proportional to the force Fz to be generated, and the latter depends on the phase shift ω.

Figure 4A:
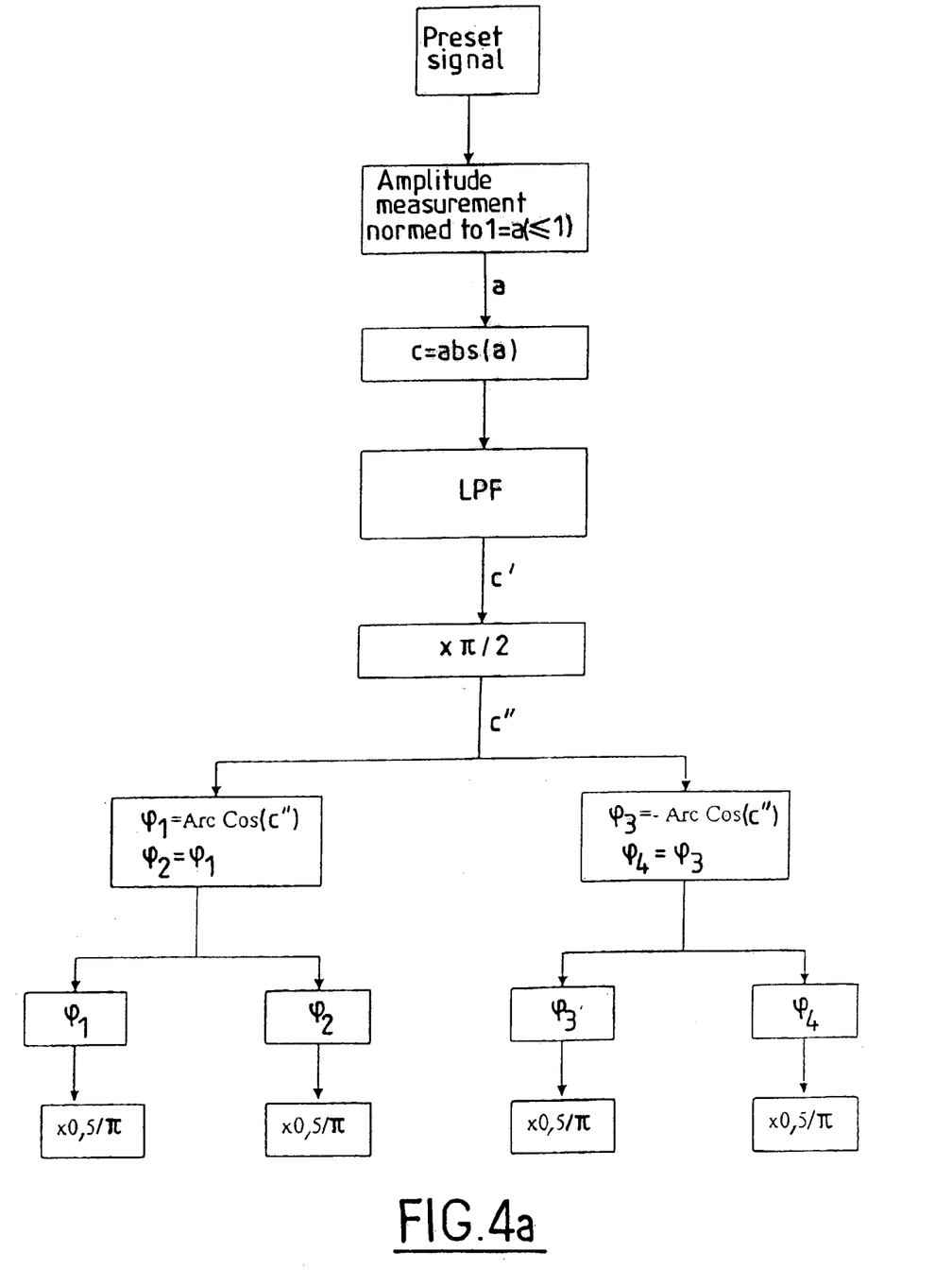
FIGS. 4a and 4b are flow charts illustrating the calculation of the phase preset and period preset respectively.

This calculation is performed as indicated in FIG. 4$a$.

The preset signal is formed so that its maximum amplitude A (for example 5 V) corresponds to 1. The formed amplitude a thus lies between −1 and +1 peak to peak.

We next take c=abs (a) (that is to say the absolute value of a).

We apply a low-pass filter LPF to c. We obtain a signal c' and we next calculate:

$$c' \times \Pi/2 = c''.$$

The phase preset φ1 and φ2 to be applied to modules 1 and 2 then equals

Arc cos c"

and the phase preset φ3 and φ4 to be applied to modules 3 and 4 equals

−Arc cos c".

This phase can be formed by dividing its value by 2π.

On the basis of the phase preset signal, speed error signal and phase error signal, a speed control signal and a phase control signal are computed in a conventional manner with proportional and integral correction (PI speed 1 to 4, and PI phase 1 to 4 ). These signals are summed to form the signal $CS_1 \ldots CS_4$ which supplies the circuits PWR 1 to 4 which deliver the control signals W1 to W4 for the motors MT1 to MT4.

An accuracy of regulation of a few % has been obtained at a frequency of 20 Hz with only one sensor C. In the case where one wishes to increase the accuracy, or extend the operation to a lower frequency, it is possible to perform more than one capture per revolution. In this case, it is preferred to retain the reference sensor C which gives a passing of the mass for the chosen reference point (here θ=0 ) and at least one module is supplemented with one or more auxiliary sensors of pointwise angular position which are offset angularly with respect to the sensor C. The signal of this or these auxiliary sensors advantageously supplies another input of the processor DSP. Specifically, the reference position being known, one is aware that the first pulse received on the other input of the DSP after a pulse provided by the reference sensor C corresponds to the first auxiliary sensor (if there are several) and so on and so forth, and there is therefore no need to assign a particular input to each of the auxiliary sensors.

For example, for three auxiliary sensors distributed 90° apart, a pip delivered by the main sensor C and three successive pips delivered by the auxiliary sensors are obtained at each revolution.

We then refresh the values stored every 90°, hence for example:

Period 1=4 (Capture1 −Capture1$p$) and so on and so forth for the other modules.

Stated otherwise, we calculate the difference between the stored values of the first and the second time period by referring these periods to one and the same angular gap for the rotating masses M.

For the time gap signals Phase Error 1 to 4, a correction of 0°, 90°, 180° and 270° must be applied depending on whether the pip is delivered by the main sensor C or one of the auxiliary sensors, so as to take account of their angular offset with respect to the reference sensor C.

Figure 4B:
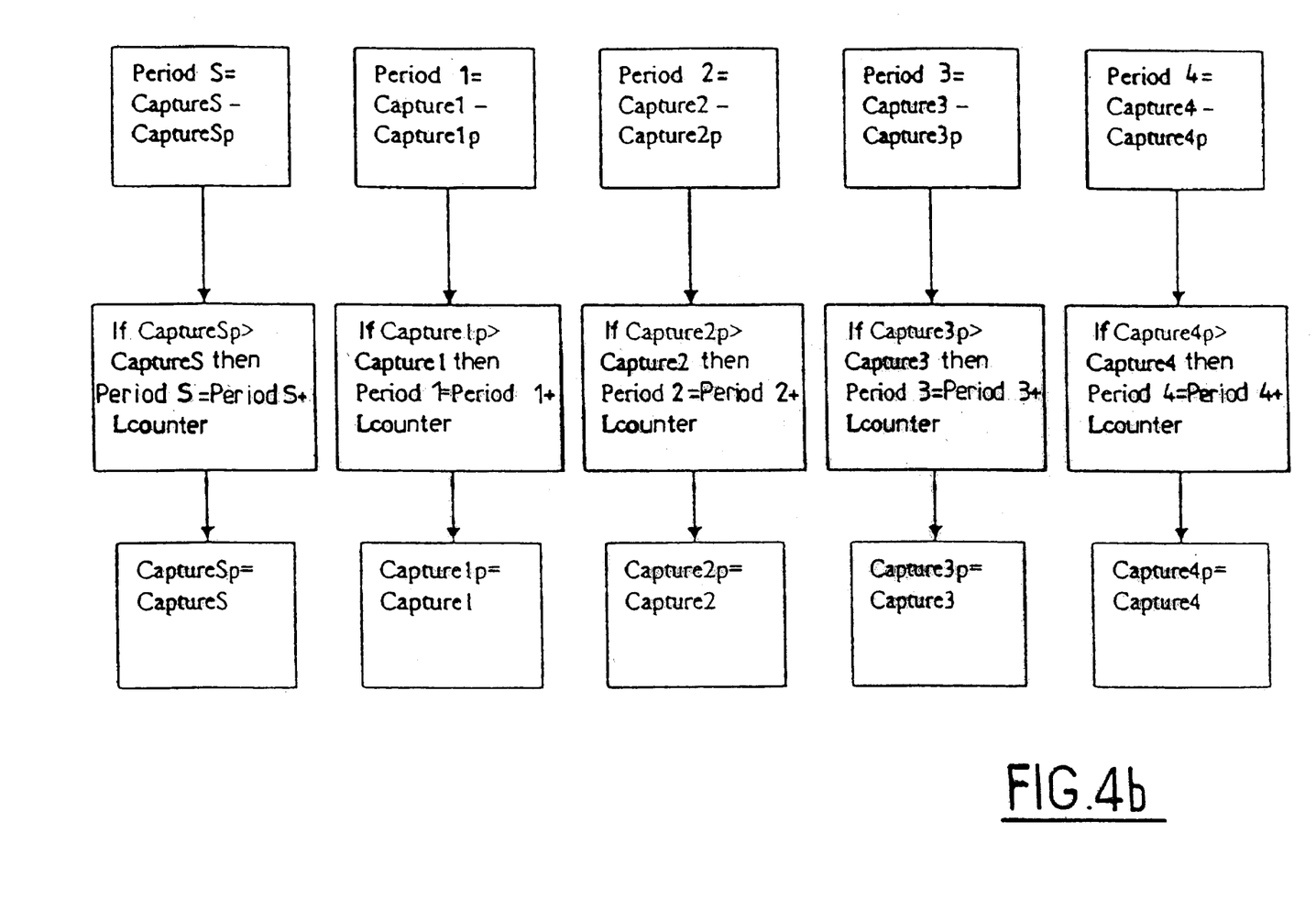

In the embodiment envisaged, a counter reset to zero periodically has been used. If this reset to zero (or more generally reinitialization to a given count) takes place between two captures, account must be taken thereof by adding the count L counter corresponding to the reinitialization to the value of the first capture Capture S and Capture1 after reinitialization (see FIG. 4$b$).

The test of a reset to zero can be Capture S<Capture Sp for the preset signal and Capture 1<Capture 1p and so on and so forth for the signals of the sensors.

In this case, the maximum count of the counter is added to Capture S and to Capture 1 to 4 so that the calculated difference (Capture S<Capture Sp) and (Capture 1<Capture 1p), etc. is right.

To start the generator, it is advantageous to apply a frequency preset to it at a frequency below the desired operating frequency, for example 5 Hz for operation at 20 Hz. Once the frequency has stabilized at the low value (5 Hz), the latter is increased to obtain the operating frequency, and the phase preset is then applied.

If at a given instant the phase gap exceeds $\pi$ (180°), this corresponding to a phase correction of greater than 0.5, then we choose for example to retard the corresponding motor (rather than to advance it).

The invention claimed is:

1. An unbalance dynamic load generator comprising at least one pair of eccentric rotating masses which are symmetric with respect to a plane and whose motion is controlled by at least one control signal generated by a control module as a function of a preset signal (Fc(t)) having a given frequency, including, for at least one of the masses, a reference angular position sensor (C) delivering a match signal (SP) representing the passing of the said rotating mass (M) through a reference angular position and a control circuit comprising a calculation circuit (DSP) for calculating the periodicity of the rotation of said mass from the successive position signals delivered by the position sensor (C) and for generating said control signal (CS) as a function of the difference between the calculated periodicity and the periodicity of the preset signal, and a phase measurement circuit for measuring a time gap between the signal delivered by the position sensor (C) and a reference point of the preset signal Fc(t) and wherein said calculation circuit (DSP) comprises a corrector module for generating said control signal also as a function of the difference between said measured time gap and a preset time gap.

2. An unbalance dynamic load generator comprising at least one pair of eccentric rotating masses which are symmetric with respect to a plane and whose motion is controlled by at least one control signal generated by a control module as a function of a preset signal (Fc(t)) having a given frequency, including, for at least one of the masses, a reference angular position sensor (C) delivering a match signal (SP) representing the passing of the said rotating mass (M) through a reference angular position and a control circuit comprising a calculation circuit (DSP) for calculating the periodicity of the rotation of said mass from the successive position signals delivered by the position sensor (C) and for generating said control signal (CS) as a function of the difference between the calculated periodicity and the periodicity of the preset signal, and including a time indicator whose value is incremented by a clock and a memory for storing the value of the time indicator when the reference angular position sensor delivers said position signal (SP) and when the preset signal Fc(t) passes through a characteristic point.

3. A generator according to claim 2, wherein the calculation circuit comprises an element for calculating from the stored values of the time indicator the first time period which separates two successive position signals (SP) and the second time period which separates the passing of the preset signal Fc(t) through two successive characteristic points and wherein the calculation circuit (DSP) comprises an element for calculating the difference between said first and second time periods.

4. A generator according to claim 3, characterized in that the said difference between the said first and second time periods is formed with respect to the second time period.

5. A generator according to claim 4, wherein said measured time gap is formed with respect to the second time period.

6. A generator according to claim 3, wherein the calculation circuit (DSP) comprises an element for calculating from the stored values of the time indicator said time gap which is measured between the instant at which the reference angular position sensor delivers the position signal and the instant at which the preset signal passes through said characteristic point.

7. A generator according to claim 3, wherein the time indicator is a counter which is reinitialized periodically, for example by resetting to zero each time it reaches its maximum count.

8. A generator according to claim 2, wherein the calculation circuit (DSP) comprises an element for calculating from the stored values of the time indicator said time gap which is measured between the instant at which the reference angular position sensor delivers the position signal and the instant at which the preset signal passes through said characteristic point.

9. A generator according to claim 2, wherein at least one module exhibits at least one auxiliary angular position sensor which is angularly offset with respect to the reference sensor.

10. A generator according to claim 9, wherein the calculation circuit comprises an element for calculating from the stored values of the time indicator the first time period which separates two successive position signals and the second time period which separates the passing of the preset signal through two successive characteristic points and in that it comprises an element for calculating the difference between the first and the second time period referred to one and the same angular gap.

11. A generator according to claim 10, wherein the calculation circuit (DSP) comprises an element for calculating from the stored values of the time indicator said time gap which is measured from the difference between the instant at which an angular position sensor delivers the position sensor or signal and the instant at which the preset signal passes through said characteristic point, by taking account in respect of the auxiliary angular position sensor or sensors of their angular offset with respect to the reference angular position sensor (C).

12. A generator according to claim 2, wherein the time indicator is a counter which is reinitialized periodically, for example by resetting to zero each time it reaches its maximum count.

13. A generator according to claim 12, comprising a logic element for adding to the stored value of the time indicator a value equal to the reinitialization of the count of the counter in respect of the first position signal after each so-called reinitialization and in respect of the first passing through the said characteristic point of the preset signal after each so-called reinitialization.

14. A generator according to claim 2, having two pairs of rotating masses, and wherein the preset signal exhibits an amplitude representing the modulus of a sinusoidal force to be produced by the conjugate action of two pairs of rotating masses by adjusting a phase 100, one of the pairs of rotating masses exhibiting a lead in phase 100 with respect to the preset signal and the other pair of rotating masses a lag in phase $\phi$, with respect to the preset signal, the calculation circuit generating on the one hand a first control signal (P1 speed) for adjusting the frequency of rotation of the rotating masses and on the other hand a second control signal for adjusting the said phase φ.

15. An unbalance dynamic load generator comprising two pairs of eccentric rotating masses which are symmetric with respect to a plane and whose motion is controlled by at least pg,20 one control signal generated by a control module as a function of a preset signal (Fc(t)) having a given frequency, including, for at least one of the masses, a reference angular position point sensor (C) delivering a match signal (SP) representing the instant at which the said rotating mass (M) passes through a reference angular position and a control circuit comprising a calculation circuit (DSP) for calculating the periodicity of the rotation of said mass from the successive position signals delivered by the position sensor (C) and for generating said control signal (CS) as a function of the difference between the calculated periodicity and the periodicity of the preset signal, and wherein the preset signal Fc(t) exhibits an amplitude representing the modulus of a sinusoidal force to be produced by the conjugate action of two pairs of rotating masses by adjusting a phase φ, one of the pairs of rotating masses exhibiting a lead in phase φ with respect to the preset signal and the other pair of rotating masses a lag in phase (0, with respect to the preset signal Fc(t), the calculation circuit generating on the one hand a first control signal (P1 speed) for adjusting the frequency of rotation of the rotating masses and on the other hand a second control signal for adjusting the said phase φ.

16. An unbalance dynamic load generator comprising two pairs of eccentric rotating masses which are symmetric with respect to a plane and whose motion is controlled by at least one control signal generated by a control module as a function of a preset signal (Fc(t)) having a pg,21 given frecuency, including, for at least one of the masses, a reference angular position point sensor (C) delivering a match signal (SP) representing the instant at which the said rotating mass (M) passes through a reference angular position and a control circuit comprising a calculation circuit (DSP) for calculating the periodicity of the rotation of said mass from the successive position signals delivered by the position sensor (C) and for generating said control signal (CS) as a function of the difference between the calculated periodicity and the periodicity of the preset signal, wherein the masses (M) of said pair are mechanically coupled together and the generator has a single so-called reference angular position sensor (C) associated with one of the two masses (M) of said pair, and wherein the preset signal exhibits an amplitude representing the modulus of a sinusoidal force to be produced by the conjugate action of two pairs of rotating masses by adjusting a phase φ, one of the pairs of rotating masses exhibiting a lead in phase φ with respect to the preset signal and the other pair of rotating masses a lag in phase φ, with respect to the preset signal, the calculation circuit generating on the one hand a first control signal (P1 speed) for adjusting the frequency of rotation of the rotating masses and on the other hand a second control signal for adjusting the said phase φ.

17. An unbalance dynamic load generator comprising two pairs of eccentric rotating masses which are symmetric with respect to a plane and whose motion is controlled by at least one control signal generated by a control module as a function of a preset signal (Fc(t)) having a given frequency, including, for at least one of the masses, a reference angular position point sensor (C) delivering a match signal (SP) representing the instant at which the said rotating mass (M) passes through a reference angular position and a control circuit comprising a calculation circuit (DSP) for calculating the periodicity of the rotation of said mass from the successive position signals delivered by the position sensor (C) and for generating said control signal (CS) as a function of the difference between the calculated periodicity and the periodicity of the preset signal, wherein the masses of said pair are mechanically independent and the generator has a reference angular position sensor (C) for each of the two masses (M) of said pair, and wherein the preset signal exhibits an amplitude representing the modulus of a sinusoidal force to be pg,22 produced by the conjugate action of two pairs of rotating masses by adjusting a phase φ one of the pairs of rotating masses exhibiting a lead in phase p with respect to the preset signal and the other pair of rotating masses a lag in phase φ with respect to the preset signal, the calculation circuit generating on the one hand a first control signal (P1 speed) for adjusting the frequency of rotation of the rotating masses and on the other hand a second control signal for adjusting the said phase φ.

* * * * *

UNITED STATES PATENT AND TRADEMARK OFFICE
CERTIFICATE OF CORRECTION

PATENT NO. : 7,132,817 B2
APPLICATION NO. : 10/369439
DATED : November 7, 2006
INVENTOR(S) : Noe Page 1 of 1

It is certified that error appears in the above-identified patent and that said Letters Patent is hereby corrected as shown below:

Column 8,
Lines 3 and 5, "formed" should read --normed--;
Line 67, "P1" should read --PI--.

Column 9,
Line 7, cancel "pg,20";
Line 24, "(0" should read --$\varphi$--;
Line 26, "P1" should read --PI--;
Line 33, cancel "pg,21";
Line 34, "freciuency" shouldread --frequency--.

Column 10,
Line 11, "P1" should read --PI--;
Line 33, cancel "pg,22";
Line 35, "p" should read --$\varphi$--;
Line 39, "P1" should read --PI--.

Signed and Sealed this

Thirteenth Day of March, 2007

JON W. DUDAS
*Director of the United States Patent and Trademark Office*